(12) United States Patent
Forutanpour et al.

(10) Patent No.: US 8,448,074 B2
(45) Date of Patent: May 21, 2013

(54) METHOD AND APPARATUS FOR PROVIDING PORTIONED WEB PAGES IN A GRAPHICAL USER INTERFACE

(75) Inventors: Babak Forutanpour, Carlsbad, CA (US); Kurt W. Abrahamson, Carlsbad, CA (US)

(73) Assignee: QUALCOMM Incorporated, San Diego, CA (US)

(*) Notice: Subject to any disclaimer, the term of this patent is extended or adjusted under 35 U.S.C. 154(b) by 389 days.

(21) Appl. No.: 12/434,086

(22) Filed: May 1, 2009

(65) Prior Publication Data

US 2010/0281400 A1 Nov. 4, 2010

(51) Int. Cl.
*G06F 3/00* (2006.01)

(52) U.S. Cl.
USPC .......................................... 715/760; 715/243

(58) Field of Classification Search
USPC .................................. 715/760, 243
See application file for complete search history.

(56) References Cited

U.S. PATENT DOCUMENTS

| | | | |
|---|---|---|---|
| 5,798,759 A | 8/1998 | Dahl | |
| 5,801,691 A | 9/1998 | Dahl | |
| 6,216,141 B1 | 4/2001 | Straub et al. | |
| 6,278,448 B1 | 8/2001 | Brown | |
| 6,704,024 B2 | 3/2004 | Robotham et al. | |
| 6,993,575 B2 | 1/2006 | Abkowitz et al. | |
| 7,221,370 B1 | 5/2007 | Arnold et al. | |
| 7,623,722 B2 | 11/2009 | Prentice et al. | |
| 2003/0156131 A1 | 8/2003 | Khazaka | |
| 2004/0098360 A1 | 5/2004 | Witwer et al. | |
| 2004/0125400 A1 | 7/2004 | De Graaff et al. | |
| 2004/0183756 A1 | 9/2004 | Freitas et al. | |
| 2005/0186913 A1 | 8/2005 | Varanda | |
| 2005/0246651 A1 | 11/2005 | Krzanowski | |
| 2007/0067305 A1* | 3/2007 | Ives | 707/10 |
| 2007/0263007 A1* | 11/2007 | Robotham et al. | 345/581 |
| 2010/0077321 A1* | 3/2010 | Shen et al. | 715/760 |
| 2011/0029907 A1* | 2/2011 | Bakhash | 715/769 |
| 2011/0066971 A1 | 3/2011 | Forutanpour et al. | |

FOREIGN PATENT DOCUMENTS

| | | |
|---|---|---|
| WO | 0157716 | 8/2001 |
| WO | WO0157716 | 8/2001 |
| WO | 03040955 | 5/2003 |
| WO | WO03040955 | 5/2003 |

OTHER PUBLICATIONS

International Search Report and Written Opinion—PCT/US2010/033016, International Search Authority—European Patent Office—Aug. 31, 2010.
International Search Report—PCT/US2010/033016—International Search Authority EPO—Aug. 31, 2010.

(Continued)

*Primary Examiner* — Andrea Leggett
(74) *Attorney, Agent, or Firm* — Nicholas A. Cole

(57) ABSTRACT

Methods and devices enable displaying selected portions of one or more webpages in user defined view windows presented on a computing device display desktop. A selected webpage may be rendered into a full-sized render buffer in order for a rendering engine to render all the elements properly. One or more view windows are created on the display desktop that show user selected portions of the render buffer. In this manner users can select portions of one or more websites for presentation on their computing device desktop, position the selected portions at their preferred locations.

20 Claims, 15 Drawing Sheets

OTHER PUBLICATIONS

International Search Report and Written Opinion—PCT/US2010/048786—International Search Authority, European Patent Office,Feb. 10, 2011.

Li S F et al: "A framework to integrate synchronous and asynchronous collaboration"Enabling Technologies: Infrastructure for Collaborative Enterprises, 1998. (WET ICE '98). Proceedings., Seventh IEEE International Workshops on Stanford, CA, USA Jun. 17-19, 1998, Los Alamitos, CA,USA,IEEE Comput. Soc, US, Jun. 17, 1998, pp. 96-101, XP010312201.

Partial International Search Report—PCT/US2010/048786—International Search Authority, European Patent Office, Dec. 14, 2010.

Written Opinion—PCT/US2010/033016—International Search Authority EPO—Aug. 31, 2010.

International Search Report, PCT/US2010/033016, International Searching Authority, European Patent Office, Aug. 31, 2010.

Written Opinion, PCT/US2010/033016, International Searching Authority, European Patent Office, Aug. 31, 2010.

RIM working on Bluetooth watch, other spellbinding accessories?, Aug. 13, 2009. http://www.engadget.com/2009/08/13/rim-working-on-bluetooth-watch-other-spellbinding-accessories/.

Bluetooth Specification Version 2.1 +EDR [vol. 1], published Jul. 26, 2007, by the Promoter Members of Bluetooth SIG, Inc.

"What is 'Client/Server' Computing?" by J.W. Rider, Nov. 2004 (Rider).

* cited by examiner

METHOD AND APPARATUS FOR PROVIDING PORTIONED WEB PAGES IN A GRAPHICAL USER INTERFACE

FIELD OF THE INVENTION

The present invention relates generally to computer graphical user interfaces, and more particularly to methods and apparatus for providing portioned web pages in a graphical user interface.

BACKGROUND

Network-enabled computing devices with graphical user interfaces, such as computer workstations and cellular telephones, often provide users with a web browser to view and interact with Internet web pages. Web pages are often defined by the website developer to be displayed in a specific manner that may not be ideal for all users. Some web browsers provide users with the ability to override certain functions and attributes of web pages, such as preventing the display of distracting ads. However, current web browsers are incapable of displaying just the portions of web pages a user selects.

SUMMARY

Various aspects provide a method for displaying webpage portions on a desktop display within a computer graphical user interface operating on a computing device that may include rendering, by a rendering engine of a first web browser instance, a first webpage into a first pixel buffer of the first web browser instance, wherein the first pixel buffer is not a child object of a window viewable on the desktop, providing to the rendering engine of the first web browser instance characteristics of a second web browser instance that has a second pixel buffer that is a child object of a window viewable on the desktop, creating a first webpage portion desktop window, and synchronizing a pixel output of the first webpage portion desktop window with portions of the first pixel buffer of the first browser instance. An aspect method may further include processing, by the first web browser instance, a user input event within the webpage portion desktop window as a user input event within a corresponding portion of the first pixel buffer of the first browser instance, and updating, by the first web browser instance, the contents of the first pixel buffer of the first browser instance based on the user input event within the webpage portion desktop window. An aspect method may further include receiving a user input defining an area on the desktop display, wherein creating a first webpage portion desktop window includes creating the first webpage portion desktop window within the area on the desktop display defined by the received user input. An aspect method may further include creating a window object for first webpage portion desktop window, and displaying the created window object on a display of the computing device. In an aspect, the webpage may be defined by an HTML document including a video content area. In an aspect the method may further include exiting the first browser instance when the webpage portion desktop window is closed. In an aspect the method may further include receiving a user input to reposition the webpage portion desktop window, and moving the webpage portion desktop window within the desktop based upon the received user input.

Various aspects also provide a computing device that may include a processor, a memory, and a display, wherein the processor is configured to perform operations including rendering, by a rendering engine of a first web browser instance, a first webpage into a first pixel buffer of the first web browser instance, wherein the first pixel buffer is not a child object of a window viewable on the desktop, providing to the rendering engine of the first web browser instance characteristics of a second web browser instance that has a second pixel buffer that is a child object of a window viewable on the desktop, creating a first webpage portion desktop window, and synchronizing a pixel output of the first webpage portion desktop window with portions of the first pixel buffer of the first browser instance. In an aspect the processor of the computing device may be configure to perform further operations including processing, by the first web browser instance, a user input event within the webpage portion desktop window as a user input event within a corresponding portion of the first pixel buffer of the first browser instance, and updating, by the first web browser instance, the contents of the first pixel buffer of the first browser instance based on the user input event within the webpage portion desktop window. In an aspect the processor of the computing device may be configure to perform further operations including receiving a user input defining an area on the desktop display, wherein creating a first webpage portion desktop window includes creating the first webpage portion desktop window within the area on the desktop display defined by the received user input. In an aspect the processor of the computing device may be configure to perform further operations including creating a window object for first webpage portion desktop window, and displaying the created window object on a display of the computing device. In an aspect the webpage may be defined by an HTML document including a video content area. In an aspect the processor of the computing device may be configure to perform further operations including exiting the first browser instance when the webpage portion desktop window is closed. In an aspect the processor of the computing device may be configure to perform further operations including receiving a user input to reposition the webpage portion desktop window, and moving the webpage portion desktop window within the desktop based upon the received user input.

Various aspects provide a computing device including a means for rendering, by a rendering engine of a first web browser instance, a first webpage into a first pixel buffer of the first web browser instance, wherein the first pixel buffer is not a child object of a window viewable on the desktop, a means for providing to the rendering engine of the first web browser instance characteristics of a second web browser instance that has a second pixel buffer that is a child object of a window viewable on the desktop, a means for creating a first webpage portion desktop window, and a means for synchronizing a pixel output of the first webpage portion desktop window with portions of the first pixel buffer of the first browser instance. In an aspect the computing device may further include a means for processing, by the first web browser instance, a user input event within the webpage portion desktop window as a user input event within a corresponding portion of the first pixel buffer of the first browser instance, and a means for updating, by the first web browser instance, the contents of the first pixel buffer of the first browser instance based on the user input event within the webpage portion desktop window. In an aspect the computing device may further include a means for receiving a user input defining an area on the desktop display, wherein a means for creating a first webpage portion desktop window includes a means for creating the first webpage portion desktop window within the area on the desktop display defined by the received user input. In an aspect the computing device may further include a means for creating a window object for first webpage portion desktop window, and a means for displaying the created window object on a display of the computing device. In an aspect, the webpage may be defined by an HTML document including a video content area. In an aspect the computing device may further include a means for exiting the first browser instance when the webpage portion desktop window is closed. In an aspect the computing device may further include a means for receiving a user input to reposition the webpage portion desktop window, and a means for moving the webpage portion desktop window within the desktop based upon the received user input.

Various aspects may also provide a computer program product including a computer readable medium which includes at least one instruction for displaying webpage portions on a desktop display within a computer graphical user interface operating on a computing device that may include rendering, by a rendering engine of a first web browser instance, a first webpage into a first pixel buffer of the first web browser instance, wherein the first pixel buffer is not a child object of a window viewable on the desktop, at least one instruction for providing to the rendering engine of the first web browser instance characteristics of a second web browser instance that has a second pixel buffer that is a child object of a window viewable on the desktop, at least one instruction for creating a first webpage portion desktop window, and at least one instruction for synchronizing a pixel output of the first webpage portion desktop window with portions of the first pixel buffer of the first browser instance. In an aspect the computer readable medium of the computer program product may further include at least one instruction for processing, by the first web browser instance, a user input event within the webpage portion desktop window as a user input event within a corresponding portion of the first pixel buffer of the first browser instance, and at least one instruction for updating, by the first web browser instance, the contents of the first pixel buffer of the first browser instance based on the user input event within the webpage portion desktop window. In an aspect the computer readable medium of the computer program product may further include at least one instruction for receiving a user input defining an area on the desktop display, wherein at least one instruction for creating a first webpage portion desktop window includes at least one instruction for creating the first webpage portion desktop window within the area on the desktop display defined by the received user input. In an aspect the computer readable medium of the computer program product may further include at least one instruction for creating a window object for first webpage portion desktop window, and at least one instruction for displaying the created window object on a display of the computing device. In an aspect, the webpage may be defined by an HTML document including a video content area. In an aspect the computer readable medium of the computer program product may further include at least one instruction for exiting the first browser instance when the webpage portion desktop window is closed. In an aspect the computer readable medium of the computer program product may further include at least one instruction for receiving a user input to reposition the webpage portion desktop window, and moving the webpage portion desktop window within the desktop based upon the received user input.

BRIEF DESCRIPTION OF THE DRAWINGS

The accompanying drawings, which are incorporated herein and constitute part of this specification, illustrate exemplary aspects of the invention, and, together with the general description given above and the detailed description given below, serve to explain features of the invention.

DETAILED DESCRIPTION

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In this description, the term "exemplary" is used herein to mean "serving as an example, instance, or illustration." Any implementation described herein as "exemplary" is not necessarily to be construed as preferred or advantageous over other implementations.

As used herein, the term "mobile device" is intended to encompass any form of programmable computing device as may exist or will be developed in the future which implements a communication module for wireless voice and data communications, including, for example, cellular telephones, personal data assistants (PDA's), palm-top computers, laptop, and notebook computers, wireless electronic mail receivers (e.g., the Blackberry® and Treo® devices), multimedia Internet enabled cellular telephones (e.g., the Blackberry Storm®), and similar personal electronic devices which include a wireless communication module, processor, and memory.

The various aspects provide methods and devices for displaying selected portions of a webpage in a view window. The various aspects may render a webpage into a full-sized render buffer, in order for a rendering engine to render all the elements properly. The various aspects may also create view windows on a computing device display desktop that show the selected portions of the render buffer. In this manner users can select portions of one or more websites for presentation on their computing device desktop, and position the selected portions at their preferred locations. Thus, a user may choose to display just a weather summary portion of a first website in a first view window, a selected stock market quote from a second website in a second view window, and a new summary portion of the first website in a third view window, with the three view windows positioned on the desktop display wherever the user prefers.

Figure 1:
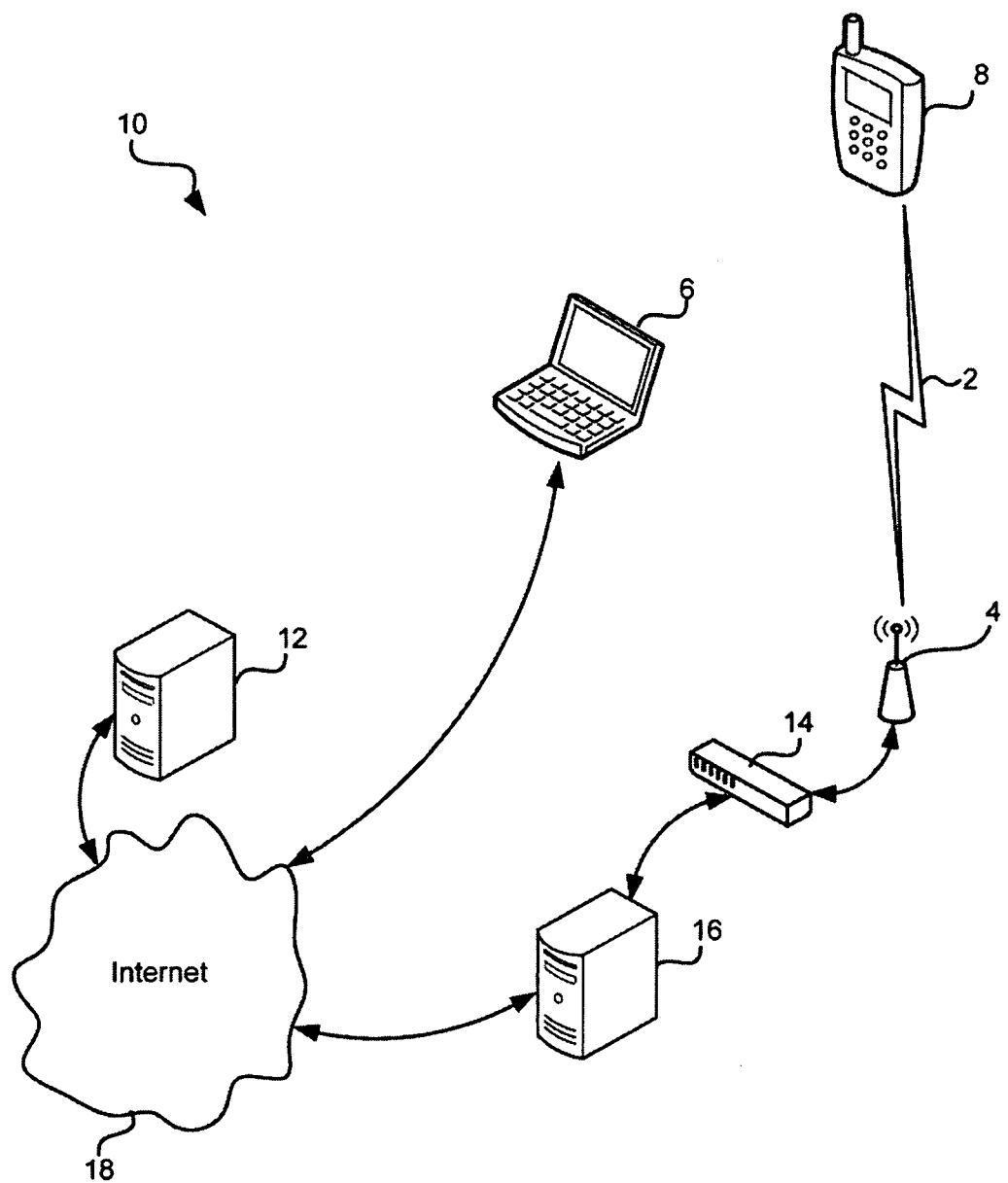
FIG. 1 is a communication system block diagram of a communication system suitable for use with the various aspects.

The various aspects may be employed in a variety of wired and wireless communication networks. By way of example, FIG. 1 shows a wireless communication network 10 employing cellular data communication links suitable for use with the various aspects. Such a communication network 10 may include a web server 12 for receiving hypertext transfer protocol (HTTP) requests via the Internet 18 and sending HTTP responses via the Internet 18. Such HTTP responses may include hypertext markup language (HTML) and extensible markup language (XML) scripts for defining a web page.

The communication network 10 may also include a personal computer (computer) 6 with a graphical user interface and a web browser capable of displaying a web page based on HTML received from the web server 12. The computer 6 may be connected to the Internet 18 via wired or wireless data links, allowing the computer 6 to communicate with the web server 12 via HTTP requests and HTTP responses transmitted over the Internet 18.

The communication network 10 may further include mobile devices 8 with a graphical user interface and a web browser capable of displaying a web page based on HTML received from the web server 12. The mobile device 8 may be configured with a network antenna and transceiver for transmitting and receiving cellular signals 2 from/to a cellular base site or base station 4. In this example network 10, the base station 4 is a part of a cellular network that includes elements required to operate the network, such as a mobile switching center (MSC) 14. In operation, the MSC 14 is capable of routing calls and messages to and from the mobile device 8 via the base station 4 when the mobile device 8 is making and receiving cellular data calls. The mobile device 8 may also be capable of sending HTTP requests and receiving HTTP responses through a gateway 16 that connects the cellular network to the Internet 18.

Figure 2A:
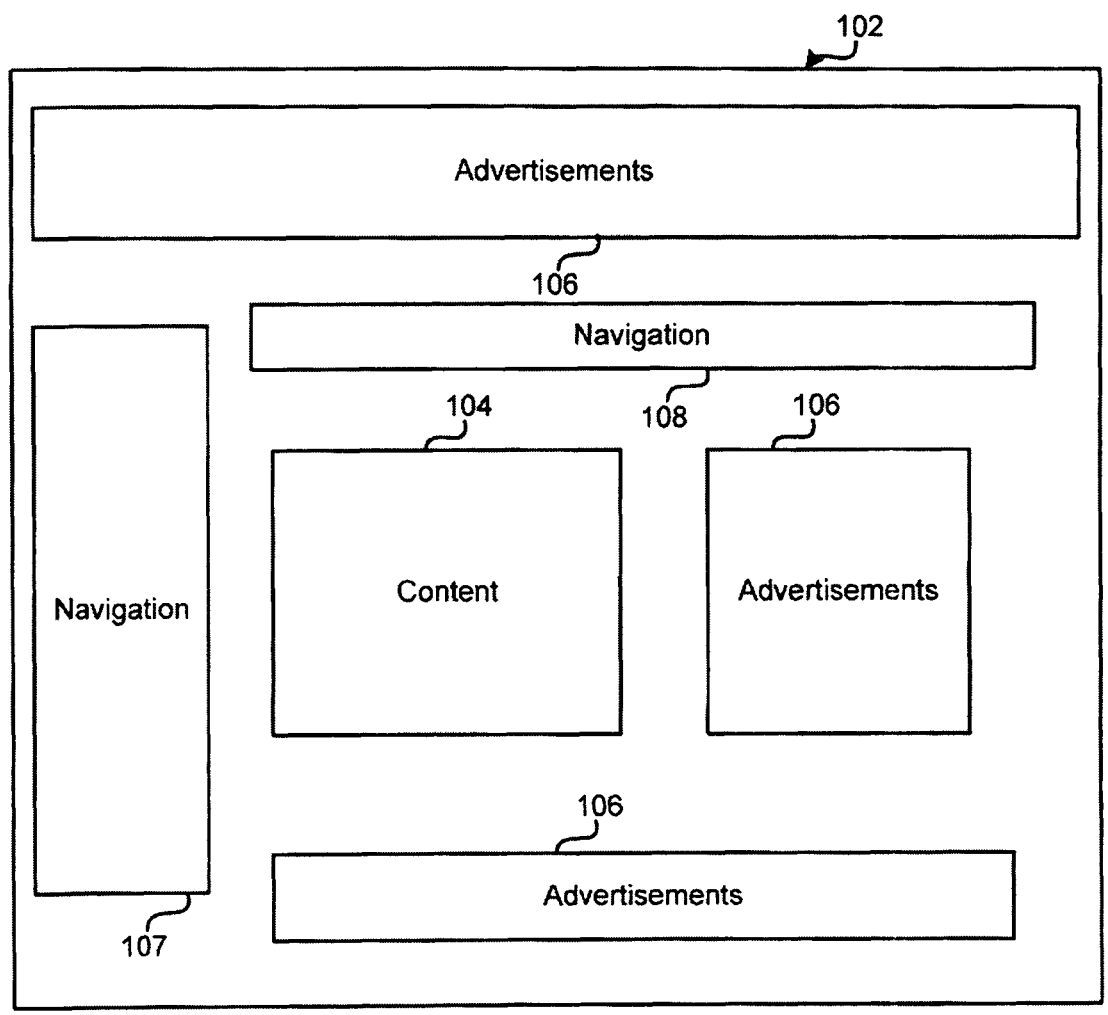
FIG. 2A is a block diagram of a conventional webpage as seen by a user.

Computing devices such as a computer 6 and a mobile device 8 may provide web browsers for displaying webpages. FIG. 2A shows a block diagram of a typical webpage as displayed by a conventional web browser. A user typically wishes to view a webpage 102 for its content, such as a stock price content 104. While the web page may consist of various elements in addition to the stock price, such as navigation links 107, 108, and advertisements 106, the user may consider the stock price content 104 to be the only relevant portion of the webpage 102. The webpage 102 may be able to update the stock price content 104 by automatically refreshing at certain intervals or through more advanced means such as asynchronous JavaScript™ and XML (AJAX).

Figure 2B:
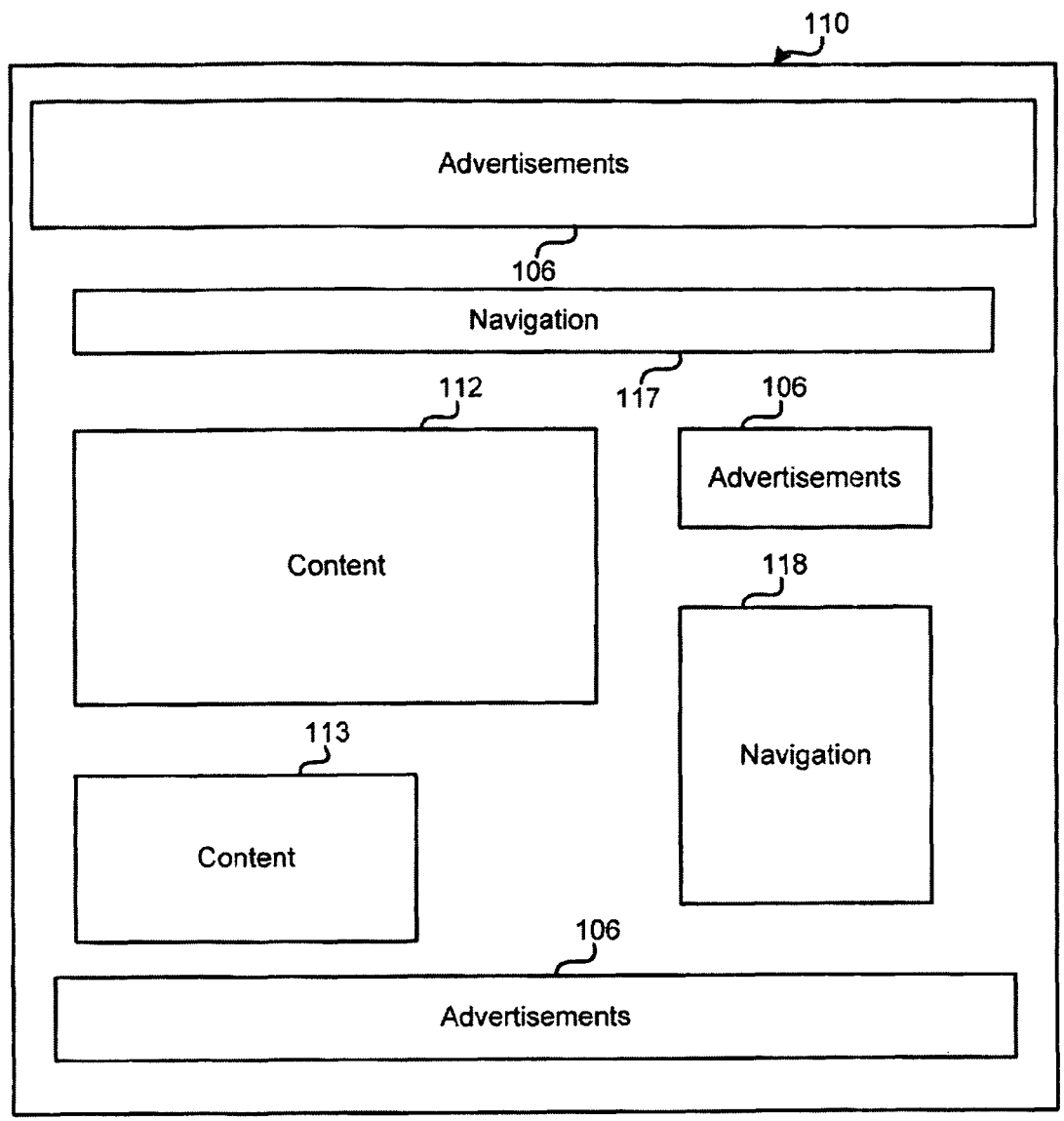
FIG. 2B is a block diagram of a conventional webpage as seen by a user.

Some webpages may have multiple areas of interest to users. Such a webpage is illustrated in FIG. 2B, which shows a block diagram of a typical webpage as displayed by a conventional web browser. The webpage 110 may include a video content area 112, a video comments content area 113, a main navigation area 117, a related videos navigation area 118, and various advertisements 106. The related videos navigation area 118 may include links to similar webpages within the same website, each of which may contain the same elements as the original webpage 110, such as the video content area 112 and the related videos navigation area 118.

Figure 3A:
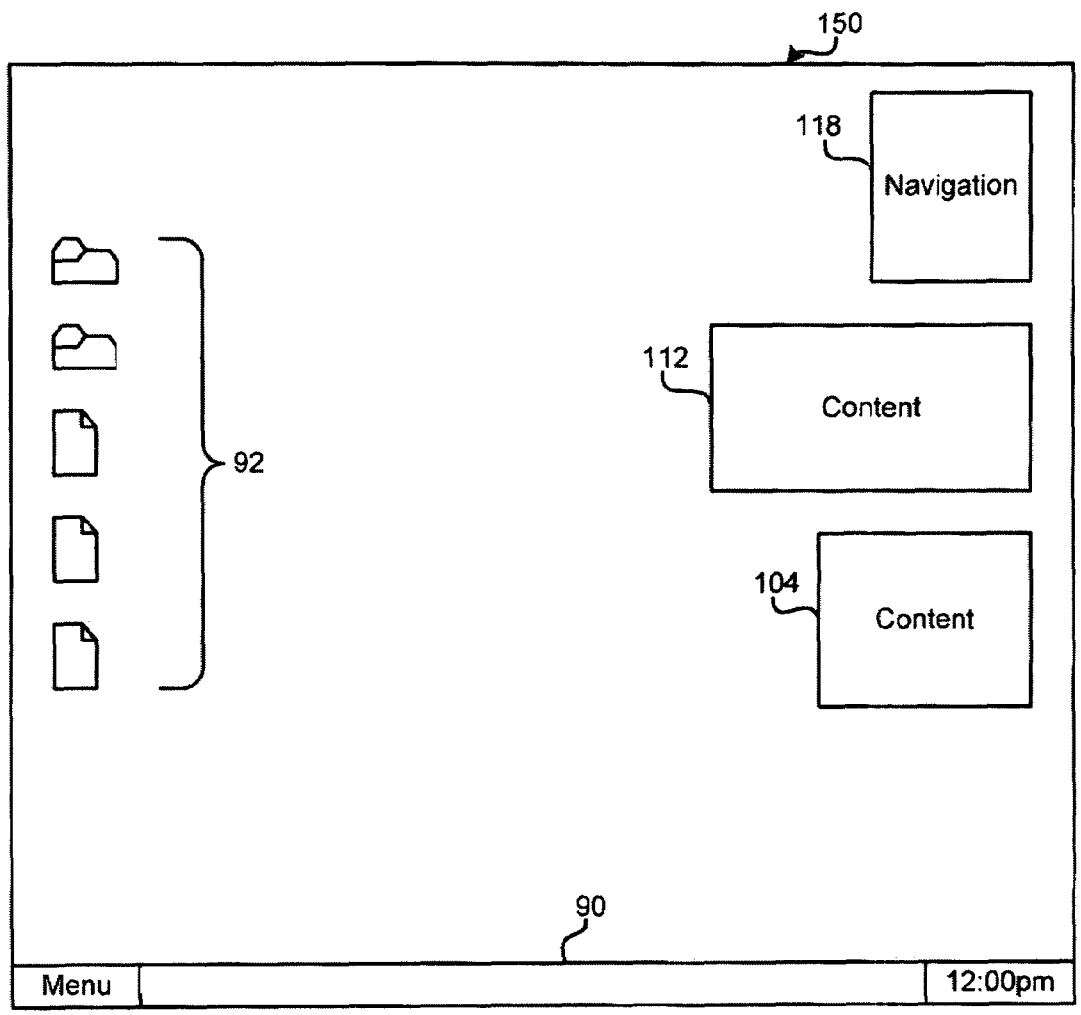
FIG. 3A is a block diagram of a computer desktop display according to an aspect.

The various aspects provide methods to allow users to view just the portions of webpages that they want. An example of how webpage portion may be presented to the user in an aspect is illustrated in FIG. 3A, which is a block diagram of a computer desktop display. The computer desktop display 150 may include a background, a taskbar 90 with a clock and a menu button, and icons 92 corresponding to data files and executable programs on the computer. The computer desktop may also contain view windows 104, 112, 118 corresponding to user selected portions of the webpages 102, 110 illustrated in FIGS. 2A and 2B. One of the view windows 104 may contain the stock price content area 104 of the webpage 102 illustrated in FIG. 2A, while the other view windows 112, 118 contains the video content area 112 and the related videos navigation area 118 of the webpage 110 illustrated in FIG. 2B. In such an aspect, the user can watch a video clip from the video website 118, and then click on a link to a related video. In response, the new video may appear in the video view window 112 with corresponding links to related videos appearing in the navigation view window 118. Such an aspect may allow the user to browse the video website and watch stock prices simultaneously, all while leaving most of the computer desktop 150 free.

Figure 3B:
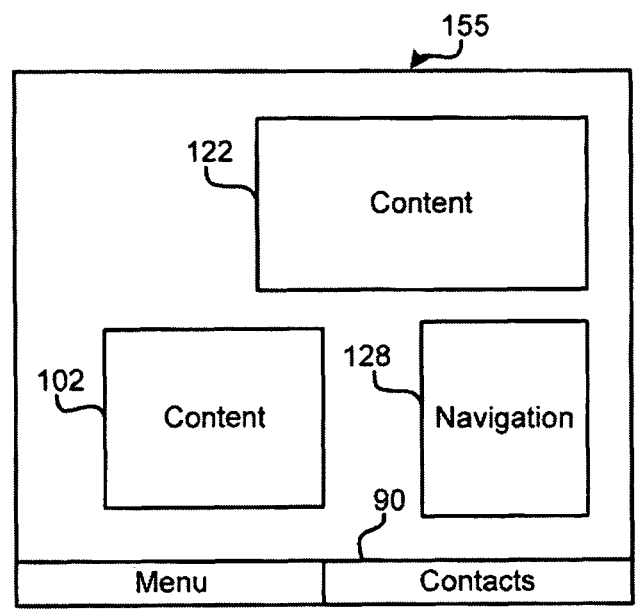
FIG. 3B is a block diagram of a mobile device desktop display according to an aspect.

Some aspects may be preferentially configured for mobile devices which typically have small displays. An example of such an aspect is illustrated in FIG. 3B. The mobile device may be configured with a graphical user interface which displays a mobile device desktop 155. In the illustrated example, a user has configured the mobile device according to an aspect to display a view window 104 corresponding to the stock price content area 104 of the webpage 102 illustrated in FIG. 2A, another view window 112 corresponding to a video content area 112 of the webpage 110 illustrated in FIG. 2B, and a third view window 118 corresponding to a related videos navigation area 118 of the webpage 110 illustrated in FIG. 2B. Similarly to the aspect discussed above with reference to FIG. 3A, mobile device implementations of the various aspects may allow the user to browse one website and while maintaining a view of a portion of another website simultaneously.

The various aspects may make use of components that are found in various computing devices configured with graphical user interfaces (GUI). GUI environments may make use of various pixel arrays for displaying graphics. Such arrays may generally be referred to as buffers, rasters, pixel buffers, pixel maps, or bitmaps. The first GUI environments utilized a single pixel buffer for displaying the output of an application on a display (e.g., a monitor). Such a pixel buffer may be referred to as a frame buffer. In a GUI environment with a single frame buffer, applications may copy data corresponding to pixel color values into the frame buffer, and the monitor may color the screen according to the data stored in the frame buffer. A frame buffer that is accessed by a display driver in order to update the display may be referred to as a system frame buffer. Pixel buffers, including system frame buffers, often make use of multiple arrays through techniques known as double buffering and triple buffering, but the various buffers may still be referred to as a single buffer.

Modern GUI environments may allow multiple graphical applications to access the same display through a concept called windowing. In such an environment, the operating system may hide the system frame buffer from most applications. Instead of accessing the system frame buffer directly, each application may send their display output to a pixel buffer, which may be referred to as a window buffer. The window buffer may be read by the window manager, an application that is part of a windowed GUI environment. The window manager may determine where, if anywhere, within the system frame buffer the contents of the window buffer should be stored. For example, a windowed GUI may have three applications running within windows, for example. If the window for application A is minimized, its output (i.e., the contents of its window buffer) may not be displayed and the contents of its window buffer may be ignored by the window manager. If the windows for application B and application C are both active on the desktop, but the window for application B partially occludes the window for application C (i.e., window B partially overlaps window C), the window manager may copy the entire contents of the window buffer of application B into the system frame buffer while only copying part of the window buffer of application C into the system frame buffer.

In addition to displaying the various windows, a window manager may also provide information to applications about the windows. For example, a window manager may notify an application when its window is minimized, resized, or hidden from view. The window manager may also provide information to the window such as the size or location of the window. Further, a window manager may notify an application when the user interacts with the application window (e.g., clicking a mouse button while the mouse pointer is positioned within the window for that application).

Graphical applications running within a windowed GUI may utilize multiple pixel buffers to generate the ultimate graphical output of the application (i.e., the window buffer). For example, consider a typical graphical text editor. From a user's perspective, the text editor may primarily contain an area for displaying and editing text. From the programmer's perspective, the text editor may contain an area in memory that stores the text file as well as a rendering engine that generates an image corresponding to the contents of the text file. The output of the rendering engine (i.e., the image) may be written to a pixel buffer, which can be referred to as a text image buffer. In addition to the main text viewing area, the text editor may also include items for controlling the application (e.g., "widgets"), such as a menu bar, a toolbar with a series of buttons, vertical and horizontal scrollbars, or a status bar. Each of the widgets may have an associated pixel buffer. For example, a scrollbar object within the text editor may have a pixel buffer that is shaded to resemble a bar that is positioned within a track. When the user moves the scrollbar downwards, the scrollbar's pixel buffer is updated so that the displayed bar appears to be moving within the track.

The various objects (e.g., the various pixel buffers and the various widgets) that make up a windowed application may be considered child objects of the instance of the windowed application. Generally, a simple application such as a text editor will correspond to a single operating system process, which may include multiple threads. Some more complex applications will have multiple processes that appear to the user as one application. As would be understood by those in the arts, the processes may be linked together as parent and child processes.

Similarly to how a window manager may not always display the entire output of some windowed applications, the text editor may hide the output of some of its buffers. In a typical text editor, when a large text file is opened only some of the text is shown and the user may view the rest of the text by utilizing the scrollbar. The text editor may maintain a text image buffer corresponding to the text file, and also maintain a pixel buffer corresponding to that part of the text image that is currently viewable by the user (i.e., the part of the text image which is part of the window buffer). Such a pixel buffer may be referred to as a view buffer. The view buffer may also be linked to a tab bar in addition to a scroll bar. In a text editor with tabbing capability, the user may open several text files at a single time. The text editor may keep each of the files in memory and render each file into respective text image buffers. The text editor may also provide the user with a series of tabs, with each one corresponding to an open file. One tab may be active at a time, with the view buffer corresponding to the text image buffer of the active file. The currently active file may be distinguished by making a tab active, which may be done by coloring the tab a different color from the other tabs (i.e., inactive tabs). When the user clicks on an inactive tab, the text editor may make that tab active by replacing the contents of the view buffer with the text image buffer corresponding to that tab.

The foregoing description is only one example method for generating displays in a windowed GUI environment. Many window managers, particularly non-compositing window managers, do not make use of a window buffer for each window. Such window managers may explicitly ask the active windows for their output and notify the occluded windows that their output is not needed. Further, windows may not store a buffer for each window element. Rather, some window elements may use vector graphics or a similar method of creating pixel images using an algorithm. Some window objects may not dedicate a portion of memory to storing the pixel output of its various subcomponents. Rather, when asked for their pixel output, such window objects will simply aggregate the pixel output of the various subcomponents, which may or may not be based on a dedicated pixel array stored in memory. Therefore, as used herein, a pixel buffer (e.g., a window buffer, a view window buffer, or a render buffer) means either a dedicated portion of memory for storing pixel values or a temporary portion of memory for storing pixel values corresponding to the result of a function call.

Figure 4:
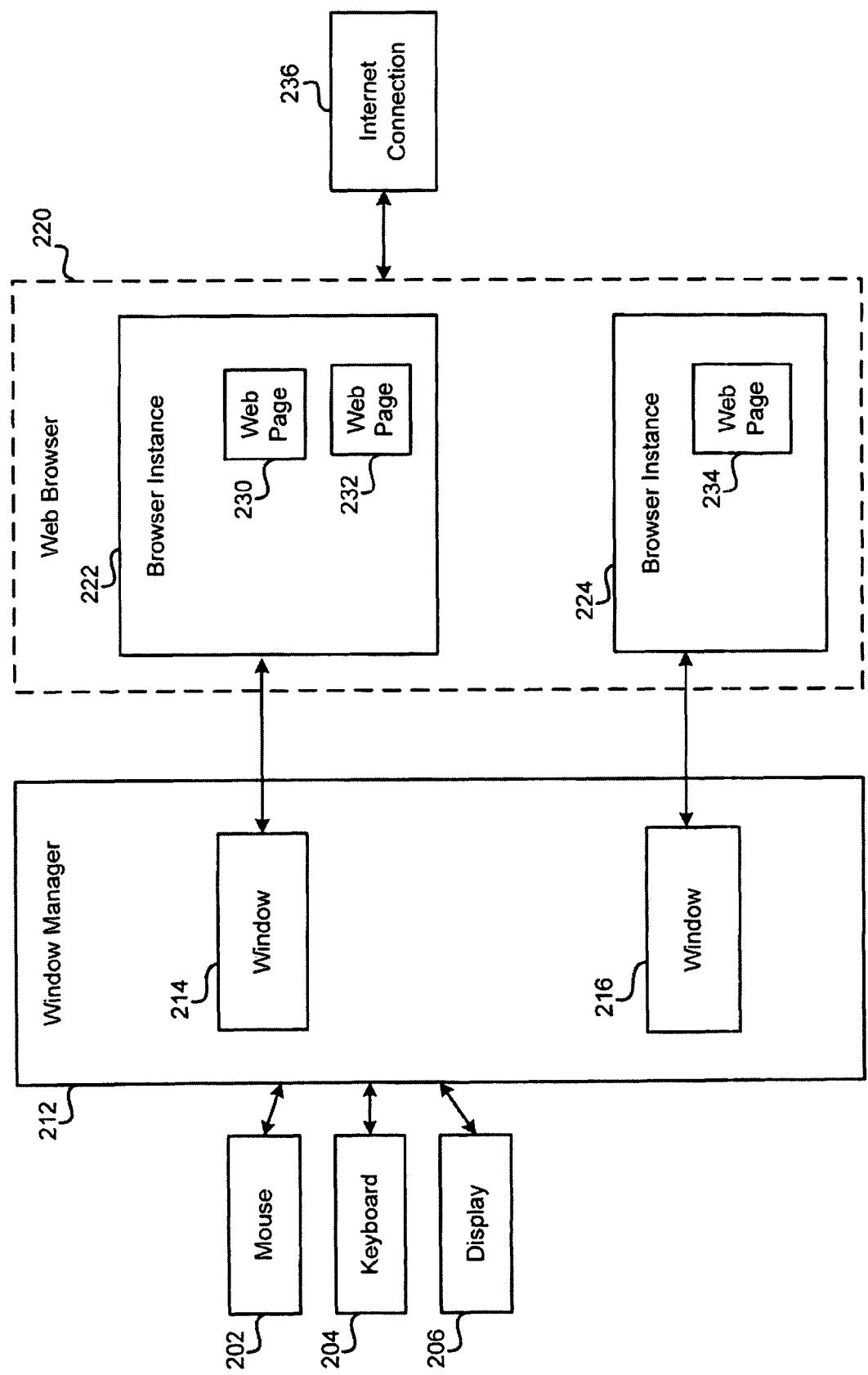
FIG. 4 is a software component block diagram according to an aspect.

Modern web browsers operate within a windowed GUI environment much like the above example text editor. FIG. 4 is a software block diagram showing some of the components of a web browser running on an operating system with a windowed GUI. The operating system may provide a mouse device 202 corresponding to a mouse attached to the computer and a keyboard device 204 corresponding to a keyboard attached to the computer. Further, the operating system may provide a display device 206 corresponding to a video card and display within the system. The display device 206 may include a system frame buffer for allowing applications to draw to the monitor. As previously described, the operating system may hide the display device 206 and corresponding system frame buffer from the various applications by making use of a window manager 212. The window manager 212 may contain various window objects, such as web browser windows 214, 216, for which it maintains status information, such as the size and location of the window within the desktop.

The operating system may also contain a web browser 220, which may be a program capable of downloading and displaying webpages. The web browser 220 may contain program code capable of receiving HTML code for a webpage through the operating system's internet connection 236. Further, the web browser 220 may contain code for parsing the received HTML code into one or more data structures representing the elements in the HTML code. Such data structures may be referred to as a Document Object Model (DOM). The web browser 220 may also contain a JavaScript™ engine which allows JavaScript™ code to alter the contents of the DOM. Further, the web browser 220 may also include a rendering engine for translating the DOM into a pixel buffer (i.e., rendering a webpage). A pixel buffer for storing the output of a rendering engine may be referred to as a render buffer.

The operating system may maintain web browser instances 222, 224 corresponding to each web browser window 214, 216. The web browser instances 222, 224 may include various widgets such as menu bars, scroll bars, and tabbed areas. A web browser instance 222 may further include an internal representation of a web page, which can be referred to as a webpage representation 234. A webpage representation 234 may primarily include two parts, a Document Object Model (DOM) for representing the structure of the web page elements (e.g., text, links, and images) and a render buffer for storing the rendered webpage. A web browser instance 222 may contain multiple webpage representations 230, 232 through the use of tabs.

Figure 5:
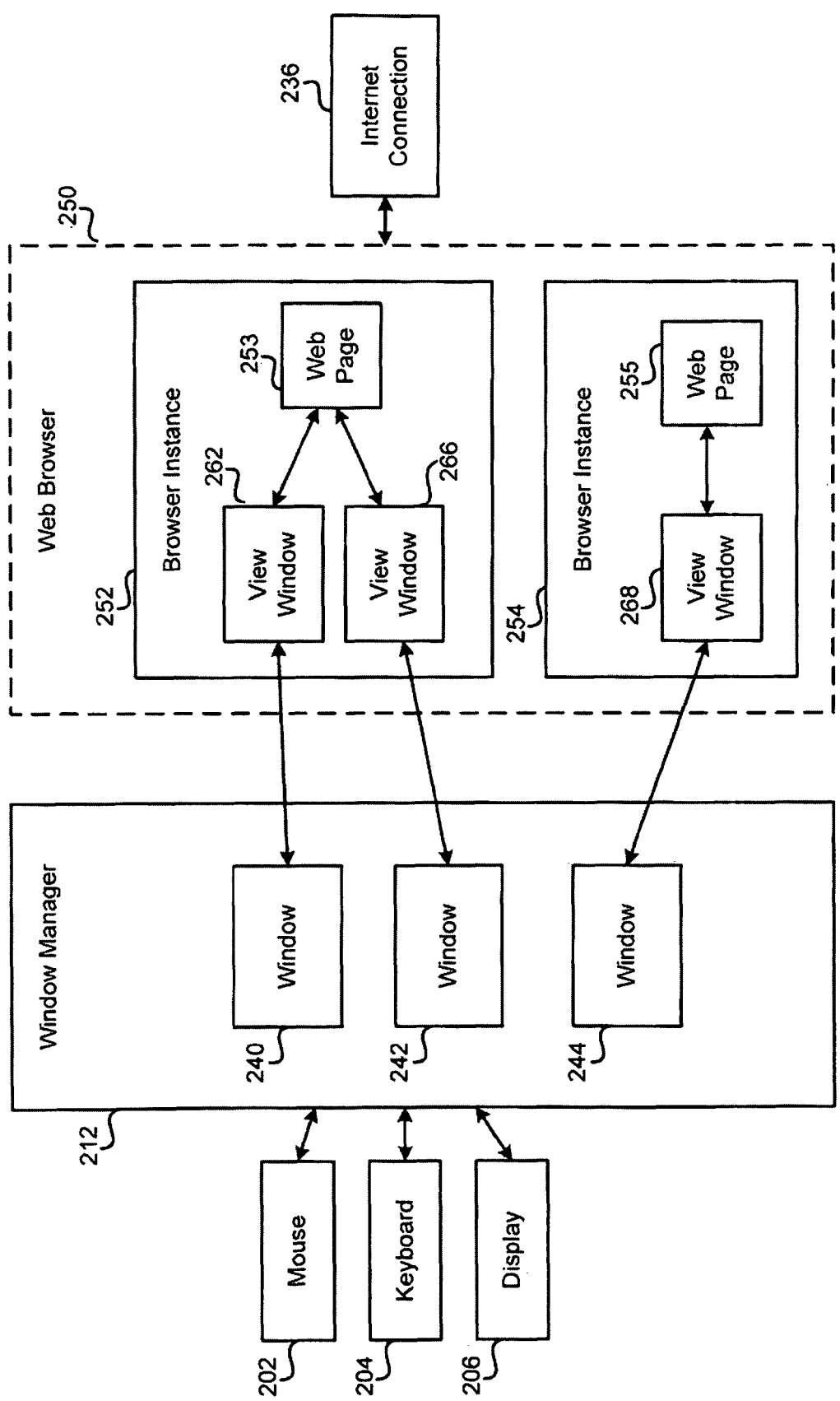
FIG. 5 is a software component block diagram according to another aspect.

The various aspects may utilize components similar to those in common web browsers to display selected portions of webpages. FIG. 5 illustrates the components of an aspect running on a computing device operating system with a windowed GUI. The aspect shown in FIG. 5 may be similar to the aspect illustrated in FIGS. 3A & 3B, which illustrates an example of three webpage portion displays corresponding to selected portions of two webpages. For example, the webpages may be a stock price webpage and a video webpage, and the selected portions may correspond to a video content area, a related videos navigation area, and a stock price content area.

The operating system may provide a mouse device 202 corresponding to a mouse attached to the computer or mobile device, a keyboard device 204 corresponding to a keyboard attached to or within the computer or mobile device, and a display device 206 corresponding to a video card and monitor attached to or within the computer or mobile device. The operating system may also utilize a window manager 212 for maintaining the windows corresponding to the various executing programs, including window objects 240, 242, 244 corresponding to each of the webpage portions.

The aspects may utilize a web browser 250 capable of displaying partial webpages. The web browser 250 may be capable of receiving HTML code corresponding to a webpage, parsing the HTML code into a DOM, and utilizing a rendering engine to generate a rendered webpage in a render buffer. The operating system may maintain web browser instances 252, 254. However, the web browser instances 252, 254 may not be linked directly to a window in the window manager. Instead, the web browser instance may maintain view windows 262, 266, 268 corresponding to the webpage portions. The web browser instances 252, 254 may maintain web page representations 253, 255 comprising a DOM and a render buffer. The view windows 262, 266, 268 may be linked to the render buffer by the web browser instances 252, 254.

In some aspects, the view windows 262, 266, 268 may include a pixel buffer that mirrors a predefined portion of the render buffer. Alternatively, the view window pixel buffer may not have a one to one correspondence with the render buffer (e.g., the view window enlarges or "zooms in" on the render buffer). Further, some aspects may allow the view windows to rotate or flip by mapping the view window buffer to the appropriate portion of the render buffer.

Returning to the example discussed above with reference to FIGS. 3A and 3B, the user may wish to show three webpage portions corresponding to two webpages. A video webpage may correspond to a web browser instance 252 containing a webpage representation 253. A stock webpage may also correspond to a web browser instance 254 and a webpage representation 255. The rendering engine of the web browser 250 may render the webpages as normal, and populate the render buffer as normal, such as in a manner described above. The web browser 250 may also maintain view windows 262, 266, 268 corresponding to each webpage portion. In the example of the stock price view window, the desktop window object 244 may correspond to a view window 268 which in turn includes a view window buffer and the coordinates within the render buffer used to sync the two buffers.

Figure 6:
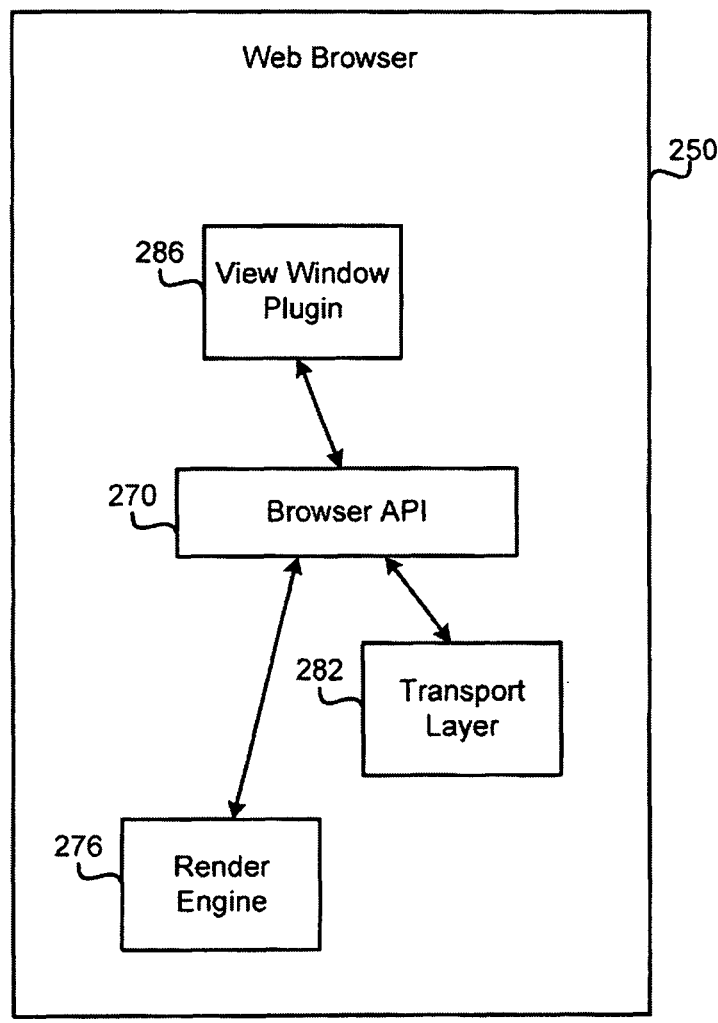
FIG. 6 is a software component block diagram of a portion of a web browser module according to another aspect.

The various aspects employ a web browser 250 which may be a standalone web browser, or an existing web browser modified with a plug-in or extension. FIG. 6 is a software components diagram of an example web browser with a plug-in for creating view windows according to an aspect. The web browser 250 may include certain components, such as a rendering engine 270 for translating a DOM into a pixel output. Another web browser 250 component may be a transport layer 282 for requesting webpages from web servers. The web browser may also include components for parsing an HTML document into a DOM, for altering the DOM via JavaScript™, and for providing the basic user interface components, such as menus and toolbars. The web browser 250 may also provide an API 270 to allow users to modify the functionality of the browser. For example, if the browser API 270 allows access to the user interface components, users may alter the look and feel of the browser by installing plug-ins known as "skins." A web browser 250 that supports a view window plug-in 286 may allow access to the render buffers through the API 270. Such a web browser 250 may also allow the view window plug-in 286 to alter the visibility of web browser instances.

Figure 7:
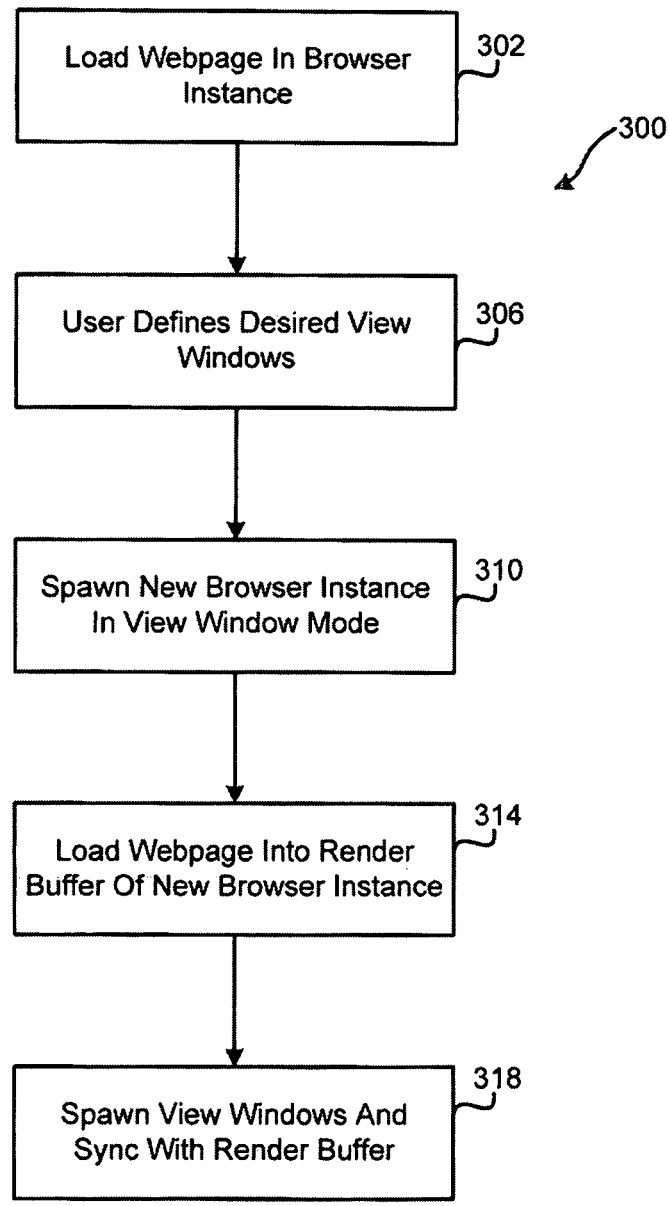
FIG. 7 is a process flow diagram of a method that may be implemented within a computer or mobile device creating windows corresponding to webpage portions.

A method for creating view windows on a computer desktop is illustrated in FIG. 7, which shows process 300 that may be implemented on a computer or a mobile device. In process 300 at block 302 a user may open a browser window (i.e., a browser instance) and load a webpage, such as, for example, a webpage including a video content area and a related videos navigation area. At block 306, the user may define the boundaries of the desired view windows. A detailed process 306 for defining a view window is described below with reference to FIG. 8. In process 300 at block 310, the web browser may spawn a new instance of itself in view window mode. A browser instance running in view window mode may take various startup parameters related to the original browser instance (i.e., the browser instance opened at block 302). Such parameters may include the URL of the webpage, as well as properties of the browser window that may be used by the rendering engine (e.g., the size of the window). The new browser instance running in view window mode may be set to invisible mode, meaning that it will not appear as a window in the desktop.

At block 314, the new browser instance may retrieve the URL of the desired webpage and load it (i.e., access the webpage on via the Internet, receive the associated HTML, parse the HTML into a DOM, pass the DOM to the rendering engine, and send the output of the rendering engine to a render buffer). The rendering engine may utilize certain characteristics of the browser window. For example, some HTML elements may have a width value set to "50%", in which case, the rendering engine will create the element to be half as many pixels wide as the viewable area of the browser window. In order for the view windows to correlate with the user-defined areas on the original webpage, the new browser instance may spoof the properties of the original browser. For example, if the rendering engine queries the new browser instance for the size of the window, the new browser instance may return a value equal to the size of the window of the original browser instance. At block 318, the new browser instance may also spawn new windows in the window manager with each having a view window buffer that is synced with a portion of the render buffer. For example, a view window corresponding to a video content area may have a buffer that duplicates a portion of the render buffer corresponding to the video content. As the render buffer updates based on the video (i.e., as the browser displays the video based on the video stream received from the video website), the view window buffer mirrors that content, and the window manager may pass the view window buffer contents to the system frame buffer. Multiple different websites may be opened and displayed in separate view windows by opening one or more new browser instances and repeating the above described processes.

Figure 8:
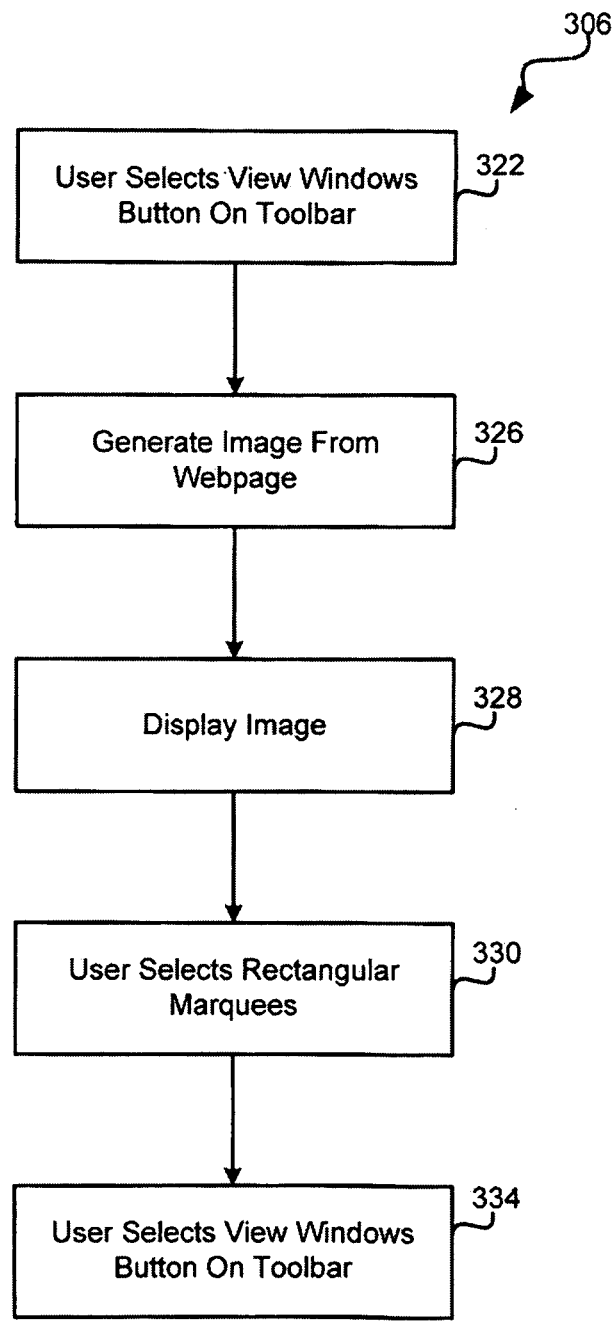
FIG. 8 is a process flow diagram of another method that may be implemented within a computer or mobile device creating windows corresponding to webpage portions.

The various aspects may utilize several methods for defining a view. One such method is illustrated in FIG. 8, which shows process 306 that may be implemented in a computer or mobile device. In process 306 at block 322, a webpage loaded in a browser window, the user may select a button on the toolbar to allow for defining view windows. At block 326, the browser instance may generate a snapshot of the webpage by transforming the contents of the render buffer into a still image. At block 328, the browser instance may temporarily replace the window contents with the buffer holding the still image. At block 330, the user may define one or more rectangular areas (i.e., "marquees") within the still image that correspond to desired view windows. The user may define a marquee by clicking the mouse button while the mouse pointer is at the position corresponding to one corner of the desired view window and moving the mouse pointer to the opposite corner of the desired view window and releasing. Such a method for "highlighting" a rectangular area is common in many GUI applications. Once the user has defined the desired view windows, at block 334 the user may click the view windows button on the toolbar for a second time. View windows may be defined for multiple different websites by repeating the above described processes on each open browser instance.

Figure 9:
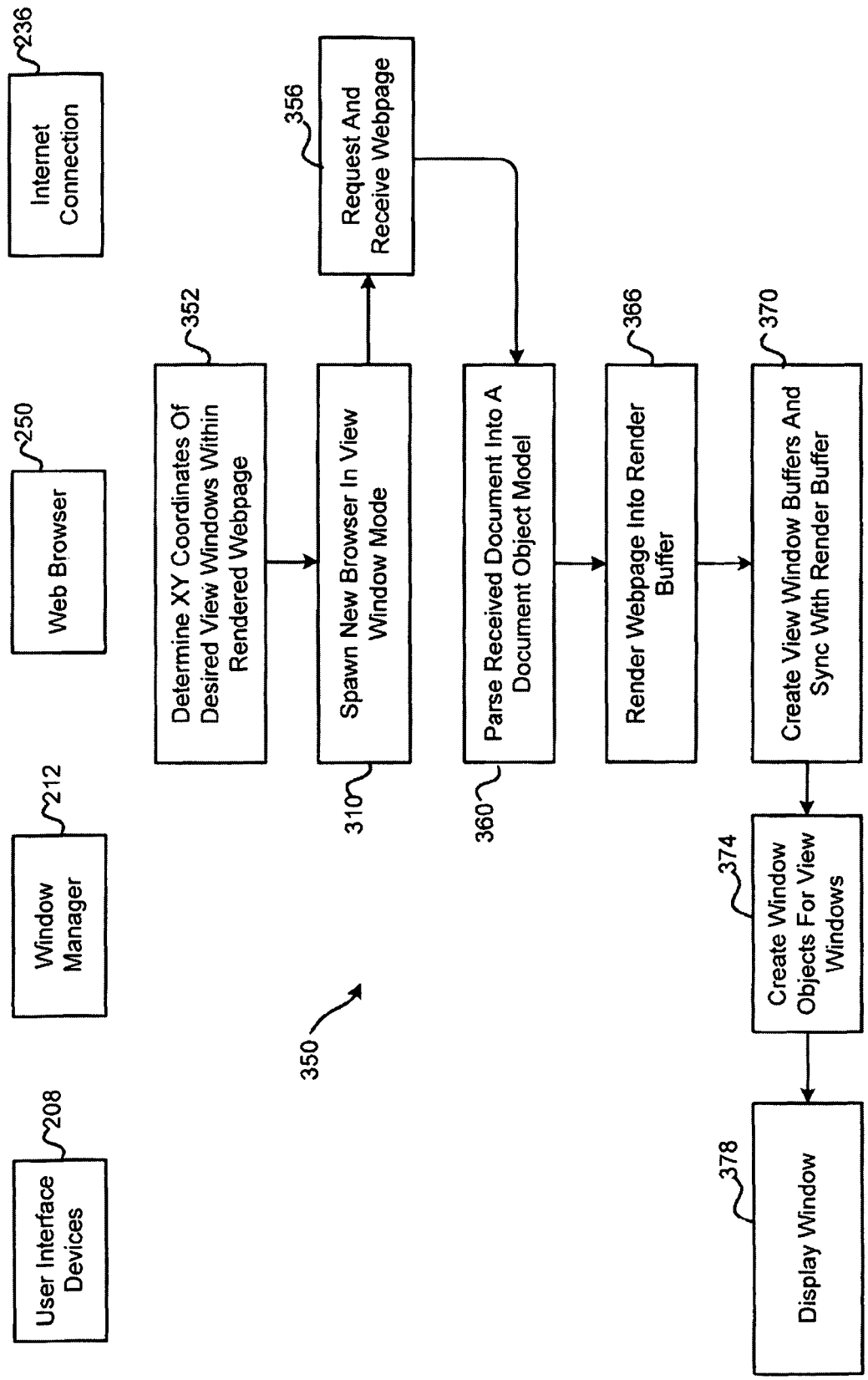
FIG. 9 is a process flow diagram of another method that may be implemented within a computer or mobile device creating windows corresponding to webpage portions.

The processes performed by the various aspects to create view windows may occur within different programs on the operating system. This can be seen in FIG. 9, which shows process 350 that may be performed on a computer or mobile device, either of which may include user interface devices 208, such as a mouse device, a keyboard device, and a display device. The various aspects may also utilize a window manager 212, a web browser 250, and an internet connection 236. In process 350 at block 352, once the user has defined the desired view windows, the web browser 250 may determine where the defined view window falls within the rendered webpage (i.e., the coordinates within the render buffer). At block 310, the web browser 250 may spawn a new browser instance in view window mode with startup parameters including the webpage URL, the window size of the current browser instance, and the coordinates of the desired view windows. The web browser 250 may request and receive the HTML document from the web server via the Internet connection 236. At block 360, the web browser 250 may also parse the received HTML document into a DOM. At block 366, the web browser 250 may also render the DOM into a render buffer. At block 370, the web browser 250 may also create buffers corresponding to view windows and sync the contents of the view window buffers with the corresponding potion of the render buffer. At block 374, web browser 250 may cause the window manager to create window objects for the view windows, which in turn causes the display device to display the windows at block 378. Multiple different websites may be opened and displayed in a similar manner by opening one or more new browser instances and repeating the above described processes.

Figure 10:
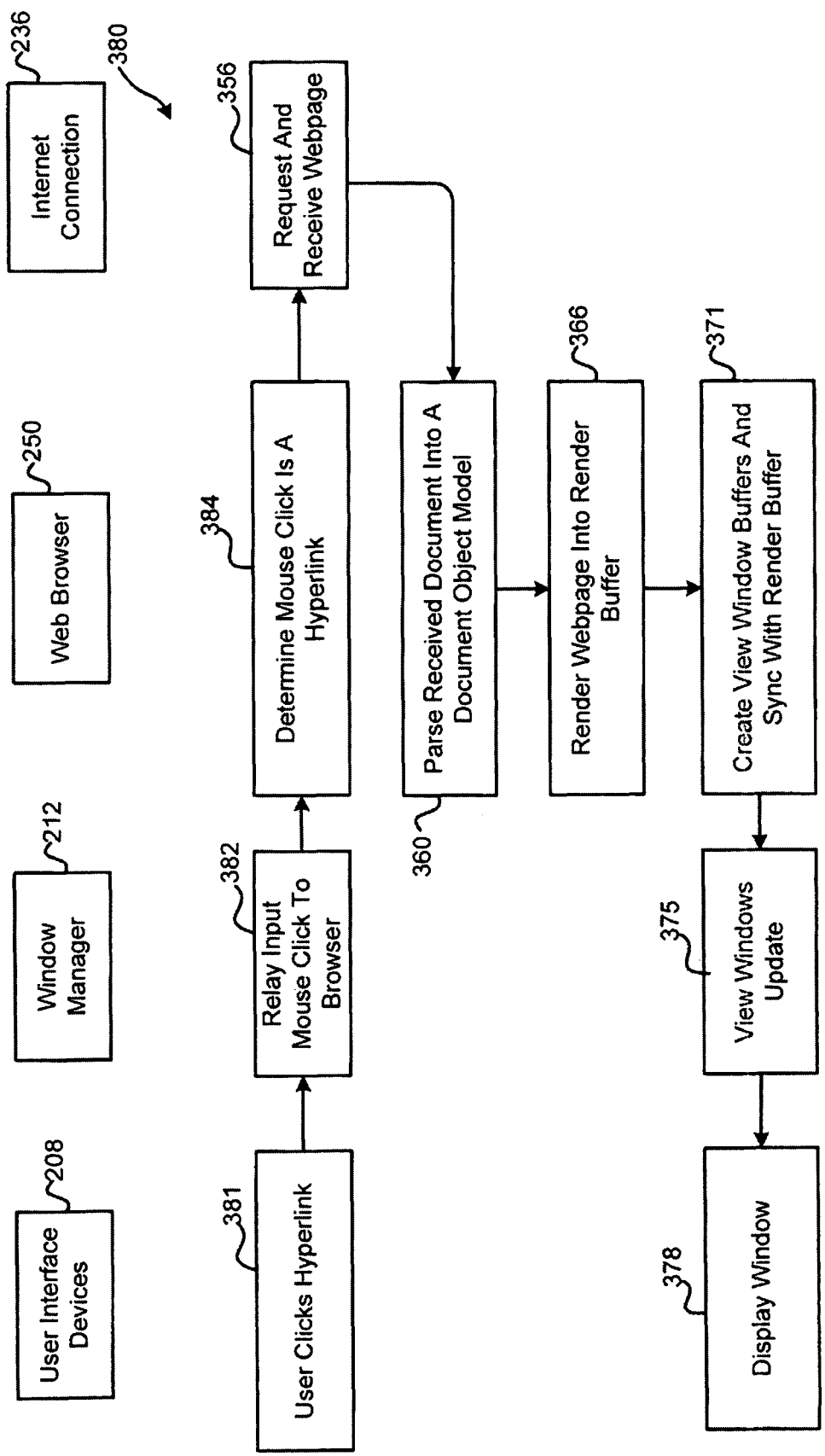
FIG. 10 is a process flow diagram of another method that may be implemented within a computer or mobile device managing windows corresponding to webpage portions.

In addition to creating view windows, the various aspects may also update the contents of existing view windows. For example, if a user clicks on a hyperlink within a related video's navigation view window, the web browser may request the webpage corresponding to the related video and show the same portions of that webpage in the view windows. An example is shown in FIG. 10 as process 380 that may be performed on a computer or mobile device. In process 380 at block 381, a user may place the mouse pointer over a hyperlink in a view window and click the mouse button. The window manager 212 may relay to the browser 250 the mouse click event and location of the mouse pointer within the view window. At block 384, the web browser 250 may determine that that mouse pointer was over a hyperlink when the mouse was clicked. At block 356, the web browser 250 may request and receive the HTML document from the web server via the internet connection 236. At block 360, the web browser 250 may parse the received HTML document into a DOM. At block 366, the web browser 250 may also render the DOM into a render buffer. At block 371, the web browser 370 may sync the existing view window buffers with the corresponding portions of the render buffer, causing the view windows to update at block 375, and the updated view windows to display on the display at block 378. In some aspects, the view window buffers may automatically sync with the render buffer once created. In such an implementation, the browser may not need to implement extra processes to display the new webpage beyond retrieving the webpage and rendering it into the render buffer. Updates to the contents of multiple view windows for multiple websites may be accomplished by performing the above described processes for view windows tied to each open browser instance.

Figure 11:
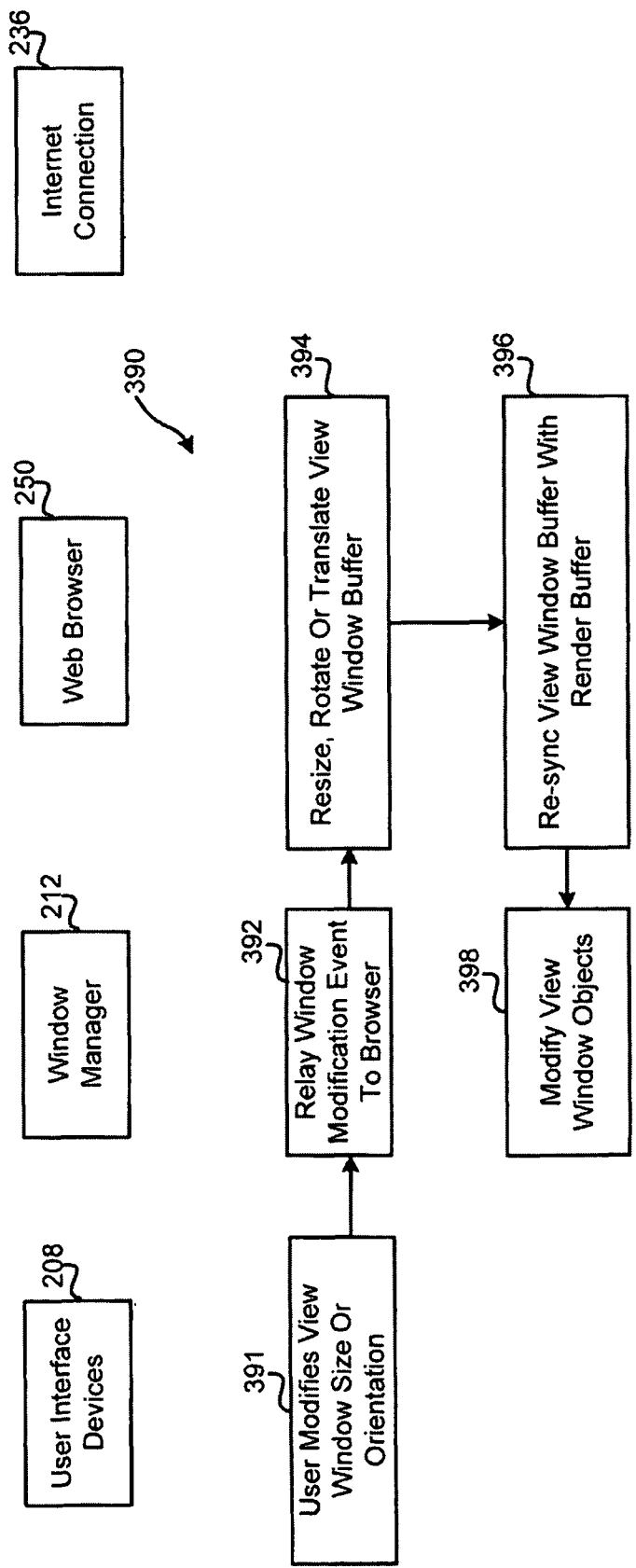
FIG. 11 is a process flow diagram of another method that may be implemented within a computer or mobile device managing windows corresponding to webpage portions.

Certain types of interactions with the view windows may be handled entirely by the window manager 212, such as moving the view windows within the desktop. Other types of interaction may invoke the web browser 250 without altering the DOM. For example, the user may resize a view window, showing a larger or smaller portion of the original webpage. An example of such an interaction is shown in FIG. 11, which shows process 390 that may be performed on a computer or mobile device. In process 390 at block 391, the user may modify the view window on the desktop using the graphical user interface. For example, the user may resize by moving the mouse pointer to a corner of the window, depressing the mouse ("clicking") and moving the mouse. As another example, the user may rotate the window, such as by clicking on a corner of the window and rotating the window. As a further example, the user may translate the image within the view window, such as by clicking on the image and moving the mouse to the left or right, and up or down. Other window modification movements may also be accomplished. At block 392, the window manager 212 may relay the window modification event to the web browser 250. At block 394, the web browser 250 may resize, rotate, translate or otherwise modify the view window buffer to correspond to the desired modification of the view window. At block 396, the web browser may sync the contents of the resized view window buffer with the render buffer. At block 398, the web browser may modify the view window objects accordingly. For example, if the user resizes the view window number of pixels in the view window buffer may change. If the original view window had a size of 100 pixels by 50 pixels that would be corresponded to the portion of the render buffer defined by coordinates (250, 150)

and (350, 200). If the user enlarges the view window by 25 pixels in each direction, the view window buffer may then become 125 pixels by 75 pixels, and correspond to the portion of the render buffer defined by coordinates (225, 125) and (350, 200). The web browser 250 may also cause the window manager 212 to modify the window object corresponding to the view window. Interactions with multiple view windows for multiple websites may be accomplished by performing the above described processes for view windows tied to each open browser instance.

The various aspects may enable more user interactions with view windows in addition to moving the view windows within the desktop, and resizing the view windows. For example, the user may wish to link certain view windows together so that when one moves, the other moves with it. Further, the user may be able to pan the contents of the view window within the render buffer. In such a case, the web browser may re-sync the contents of the view window buffer similar to the processes performed at block 386 without resizing the view window buffer. In another example, the user may wish to resize the contents of the view window by zooming in or out. This may involve enlarging the view window and the view window buffer, but rather than showing more of the render buffer, the view window may show the same portion of the render buffer. Such an enlarged view window may no longer have a one-to-one pixel correspondence with the render buffer. Further examples include duplicating a view window, spawning a new view window from an existing view window rather than a normal browser window, and moving a view window to a different display device or desktop. Finally, the user may wish to close a view window. In some aspects, when the user closes a view window, the web browser will terminate the web browser instance when no other view windows corresponding to that instance remain open.

In some aspects, user interface controls may be provided to enable the user to open a full web browser window from a view window. In such an implementation, the web browser instance managing the view windows and the webpage representation may open a normal browser window as a sibling process (i.e., neither a child nor a parent process) and terminate itself and close the view windows in the web browser. In an aspect, a user interface control may enable the user to trigger this process by a menu interaction. In another aspect, a user interface control may enable the user to trigger the process by moving the view windows on the desktop. For example, in an aspect, a user interface control may include bringing together multiple view windows that correspond to the same web browser instance, or dragging a view window to a predefined portion of the desktop such as a trash icon. Thus, for example, a user could bring all the child views on the desktop together for a given webpage in order to signal that the user wants the original webpage displayed again and not the child windows anymore.

In the various aspects, view windows may be positioned on the desktop in any manner provided for graphics and application windows. Thus, view windows may be stacked one atop the other so that one view may partially block another. Further, user interface controls may be provided to enable users to change the stacking order and thus change the visible view window (i.e., the view window on top). For example, a user may click on a lower order view window in a stack (i.e., a window at least partially occluded by a higher order view window) in order to bring it to the front. As another example, a user may toggle through stacked view windows by executing a user interface control, such as right clicking on a mouse button.

Figure 12:
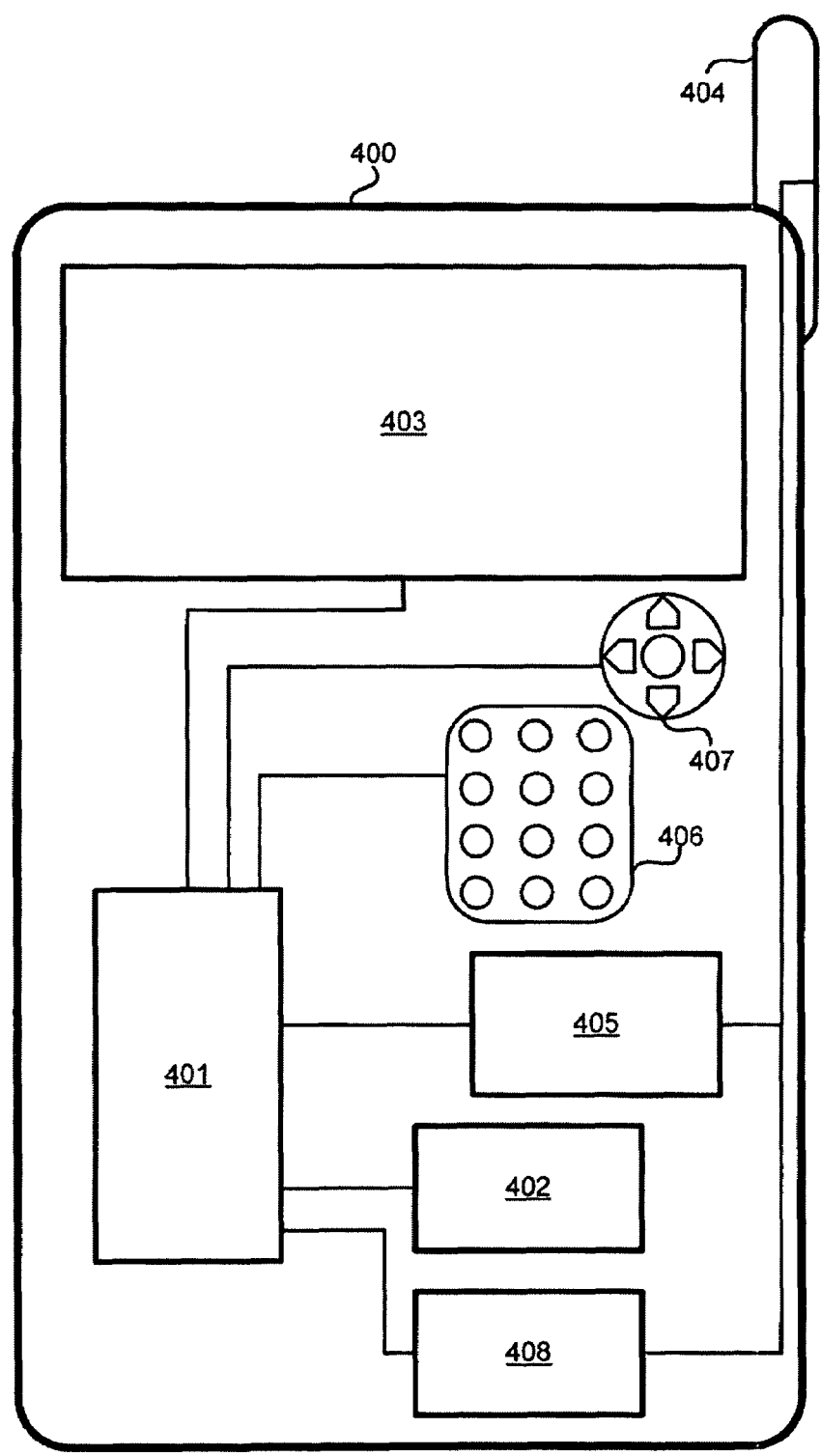
FIG. 12 is a circuit block diagram of an example mobile device suitable for use with the various aspects.

The aspects described above may be implemented on any of a variety of portable computing devices, such as, for example, cellular telephones, personal data assistants (PDA), mobile web access devices, and other processor-equipped devices that may be developed in the future configured to communicate with the external networks, such as via a wireless data link. Typically, such portable computing devices will have in common the components illustrated in FIG. 12. For example, the portable computing devices 400 may include a processor 401 coupled to internal memory 402 and to a display 403. Additionally, the portable computing device 400 may have an antenna 404 for sending and receiving electromagnetic radiation that is connected to a wireless data link and/or cellular telephone transceiver 405 coupled to the processor 401. Portable computing devices 400 also typically include a key pad 406 or miniature keyboard, and menu selection buttons or rocker switches 407 for receiving user inputs, as well as a speaker 409 for generating an audio output.

The processor 401 may be any programmable microprocessor, microcomputer or multiple processor chip or chips that can be configured by software instructions (applications) to perform a variety of functions, including the functions of the various aspects described above. In some portable computing device 400, multiple processors 401 may be provided, such as one processor dedicated to managing voice and data communications, and one processor dedicated to running other applications. Typically, software applications may be stored in the internal memory 402 before they are accessed and loaded into the processor 401. In some mobile devices 400, the processor 401 may include internal memory sufficient to store the application software instructions. For the purposes of this description, the term memory refers to all memory accessible by the processor 401, including internal memory 402 and memory within the processor 401 itself. In many portable computing devices 400, the memory 402 may be a volatile or nonvolatile memory, such as flash memory, or a mixture of both.

Figure 13:
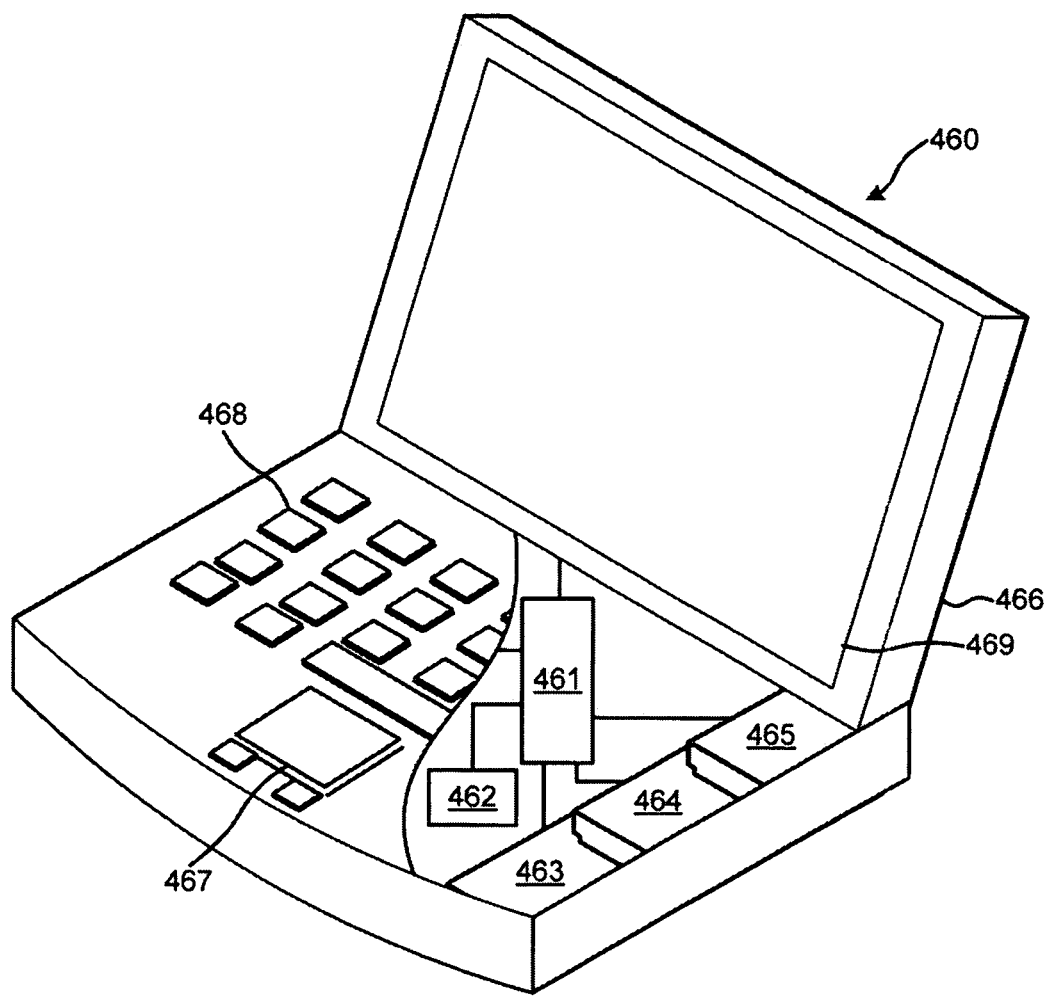
FIG. 13 is a circuit block diagram of an example computer suitable for use with the various aspects.

A number of the aspects described above may also be implemented with any of a variety of computing devices, such as a notebook computer 460 illustrated in FIG. 13. Such a notebook computer 460 typically includes a housing 466 that contains a processor 461 coupled to volatile memory 462 and a large capacity nonvolatile memory, such as a disk drive 463. The computer 460 may also include a floppy disc drive 464 and a compact disc (CD) drive 465 coupled to the processor 461. The computer housing 466 typically also includes a touchpad 467, keyboard 468 and the display 469.

The various aspects may be implemented by a computer processor 401, 461 executing software instructions configured to implement one or more of the described methods. Such software instructions may be stored in memory 402, 462 as separate applications, or as compiled software implementing an aspect method. Reference database may be stored within internal memory 402, 462, in hard disc memory 464, on tangible storage medium or on servers accessible via a network (not shown). Further, the software instructions and databases may be stored on any form of tangible processor-readable memory, including: a random access memory 402, 462, hard disc memory 463, a floppy disk (readable in a floppy disc drive 464), a compact disc (readable in a CD drive 465), electrically erasable/programmable read only memory (EEPROM), read only memory (such as FLASH memory), and/or a memory module (not shown) plugged into the computing device 400, 460, such as an external memory chip or a USB-connectable external memory (e.g., a "flash drive") plugged into a USB network port.

The foregoing method descriptions and the process flow diagrams are provided merely as illustrative examples and are not intended to require or imply that the processes of the various aspects must be performed in the order presented. As will be appreciated by one of skill in the art the order of blocks and processes in the foregoing aspects may be performed in any order. Words such as "thereafter," "then," "next," etc. are not intended to limit the order of the processes; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some processes or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The processes of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for displaying webpage portions on a desktop display within a computer graphical user interface operating on a computing device, comprising:
   rendering, by a rendering engine of a first web browser instance, a first webpage into a first pixel buffer of the first web browser instance, wherein the first pixel buffer is not a child object of a window viewable on the desktop;
   providing to the rendering engine of the first web browser instance characteristics of a second web browser instance that has a second pixel buffer that is a child object of a window viewable on the desktop, wherein the second web browser instance contains a Document Object Model (DOM) independent of a DOM of the first web browser instance;
   creating a first webpage portion desktop window;
   synchronizing a pixel output of the first webpage portion desktop window with portions of the first pixel buffer of the first browser instance;
   receiving a user input defining an area on the desktop display; and
   displaying the first webpage portion desktop window on a display of the computing device
   wherein creating a first webpage portion desktop window comprises creating the first webpage portion desktop window corresponding to the area on the desktop display defined by the received user input.

2. The method of claim 1, further comprising:
   processing, by the first web browser instance, a user input event within the webpage portion desktop window as a user input event within a corresponding portion of the first pixel buffer of the first browser instance; and
   updating, by the first web browser instance, the contents of the first pixel buffer of the first browser instance based on the user input event within the webpage portion desktop window.

3. The method of claim 1, wherein the webpage comprises:
   a webpage defined by an HTML document comprising a video content area.

4. The method of claim 1, further comprising:
exiting the first browser instance when the webpage portion desktop window is closed.

5. The method of claim 1, further comprising:
receiving a user input to reposition the webpage portion desktop window; and
moving the webpage portion desktop window within the desktop based upon the received user input.

6. A computing device, comprising:
a processor;
a memory coupled to the processor; and
a display coupled to the processor,
wherein the processor is configured with processor-executable instructions to perform steps comprising:
rendering, by a rendering engine of a first web browser instance, a first webpage into a first pixel buffer of the first web browser instance, wherein the first pixel buffer is not a child object of a window viewable on the desktop;
providing to the rendering engine of the first web browser instance characteristics of a second web browser instance that has a second pixel buffer that is a child object of a window viewable on the desktop, wherein the second web browser instance contains a Document Object Model (DOM) independent of a DOM of the first web browser instance;
creating a first webpage portion desktop window;
synchronizing a pixel output of the first webpage portion desktop window with portions of the first pixel buffer of the first browser instance;
receiving a user input defining an area on the desktop display; and
displaying the first webpage portion desktop window on a display of the computing device,
wherein creating a first webpage portion desktop window comprises creating the first webpage portion desktop window corresponding to the area on the desktop display defined by the received user input.

7. The computing device of claim 6, wherein the processor is configured with processor-executable instructions to perform steps further comprising:
processing, by the first web browser instance, a user input event within the webpage portion desktop window as a user input event within a corresponding portion of the first pixel buffer of the first browser instance; and
updating, by the first web browser instance, the contents of the first pixel buffer of the first browser instance based on the user input event within the webpage portion desktop window.

8. The computing device of claim 6, wherein the webpage comprises:
a webpage defined by an HTML document comprising a video content area.

9. The computing device of claim 6, wherein the processor is configured with processor-executable instructions to perform steps further comprising:
exiting the first browser instance when the webpage portion desktop window is closed.

10. The computing device of claim 6, wherein the processor is configured with processor-executable instructions to perform steps further comprising:
receiving a user input to reposition the webpage portion desktop window; and
moving the webpage portion desktop window within the desktop based upon the received user input.

11. A computing device, comprising:
means for rendering, by a rendering engine of a first web browser instance, a first webpage into a first pixel buffer of the first web browser instance, wherein the first pixel buffer is not a child object of a window viewable on the desktop;
means for providing to the rendering engine of the first web browser instance characteristics of a second web browser instance that has a second pixel buffer that is a child object of a window viewable on the desktop, wherein the second web browser instance contains a Document Object Model (DOM) independent of a DOM of the first web browser instance;
means for creating a first webpage portion desktop window;
means for synchronizing a pixel output of the first webpage portion desktop window with portions of the first pixel buffer of the first browser instance;
means for receiving a user input defining an area on the desktop display; and
means for displaying the first webpage portion desktop window on a display of the computing device,
wherein the means for creating a first webpage portion desktop window comprises means for creating the first webpage portion desktop window corresponding to the area on the desktop display defined by the received user input.

12. The computing device of claim 11, further comprising:
means for processing, by the first web browser instance, a user input event within the webpage portion desktop window as a user input event within a corresponding portion of the first pixel buffer of the first browser instance; and
means for updating, by the first web browser instance, the contents of the first pixel buffer of the first browser instance based on the user input event within the webpage portion desktop window.

13. The computing device of claim 11, wherein the webpage comprises:
a webpage defined by an HTML document comprising a video content area.

14. The computing device of claim 11, further comprising:
means for exiting the first browser instance when the webpage portion desktop window is closed.

15. The computing device of claim 11, further comprising:
means for receiving a user input to reposition the webpage portion desktop window; and
means for moving the webpage portion desktop window within the desktop based upon the received user input.

16. A non-transitory computer readable medium having stored thereon processor-executable instructions, configured to cause a processor to perform operations for displaying webpage portions on a desktop display within a computer graphical user interface operating on a computing device, the operations comprising:
rendering, by a rendering engine of a first web browser instance, a first webpage into a first pixel buffer of the first web browser instance, wherein the first pixel buffer is not a child object of a window viewable on the desktop;
providing to the rendering engine of the first web browser instance characteristics of a second web browser instance that has a second pixel buffer that is a child object of a window viewable on the desktop, wherein the second web browser instance contains a Document Object Model (DOM) independent of a DOM of the first web browser instance;

creating a first webpage portion desktop window;

synchronizing a pixel output of the first webpage portion desktop window with portions of the first pixel buffer of the first browser instance;

receiving a user input defining an area on the desktop display; and displaying the first webpage portion desktop window on a display of the computing device, wherein creating a first webpage portion desktop window comprises creating the first webpage portion desktop window corresponding to the area on the desktop display defined by the received user input.

17. The non-transitory computer readable medium of claim 16, wherein the stored processor-executable instructions are configured to cause a processor to perform operations further comprising:

processing, by the first web browser instance, a user input event within the webpage portion desktop window as a user input event within a corresponding portion of the first pixel buffer of the first browser instance; and updating, by the first web browser instance, the contents of the first pixel buffer of the first browser instance based on the user input event within the webpage portion desktop window.

18. The non-transitory computer readable medium of claim 16, wherein the webpage comprises:

a webpage defined by an HTML document comprising a video content area.

19. The non-transitory computer readable medium of claim 16, wherein the stored processor-executable instructions are configured to cause a processor to perform operations further comprising:

exiting the first browser instance when the webpage portion desktop window is closed.

20. The non-transitory computer readable medium of claim 16, wherein the stored processor-executable instructions are configured to cause a processor to perform operations further comprising:

receiving a user input to reposition the webpage portion desktop window; and moving the webpage portion desktop window within the desktop based upon the received user input.

* * * * *